(12) United States Patent
Peng et al.

(10) Patent No.: US 10,158,249 B2
(45) Date of Patent: Dec. 18, 2018

(54) WIRELESS TEMPERATURE MAINTENANCE CONTAINER

(71) Applicant: PENG FA DESIGN INTERNATIONAL CO. LTD., Hsinchu County (TW)

(72) Inventors: Yen-Chun Peng, Hsinchu County (TW); Yun-Yi Ting, Taipei (TW)

(73) Assignee: PENG FA DESIGN INTERNATIONAL CO. LTD., Hsinchu County (TW)

( * ) Notice: Subject to any disclaimer, the term of this patent is extended or adjusted under 35 U.S.C. 154(b) by 202 days.

(21) Appl. No.: 15/158,773

(22) Filed: May 19, 2016

(65) Prior Publication Data

US 2017/0229909 A1 Aug. 10, 2017

(30) Foreign Application Priority Data

Feb. 5, 2016 (TW) .............................. 105202107 U

(51) Int. Cl.
| | |
|---|---|
| *H01F 27/42* | (2006.01) |
| *H01F 37/00* | (2006.01) |
| *H01F 38/00* | (2006.01) |
| *H02J 50/10* | (2016.01) |
| *H02J 50/80* | (2016.01) |
| *F25B 21/02* | (2006.01) |
| *A47J 36/24* | (2006.01) |

(52) U.S. Cl.
CPC ............ *H02J 50/10* (2016.02); *A47J 36/2472* (2013.01); *A47J 36/2483* (2013.01); *F25B 21/02* (2013.01); *H02J 50/80* (2016.02)

(58) Field of Classification Search
CPC .. H02J 50/10; H02J 50/80; F25B 21/02; A47J 36/2472
See application file for complete search history.

(56) References Cited

U.S. PATENT DOCUMENTS

| | | | | |
|---|---|---|---|---|
| 2005/0018857 | A1* | 1/2005 | McCarty | .................. H04B 3/54 381/58 |
| 2007/0106172 | A1* | 5/2007 | Abreu | .................. A61B 5/0002 600/549 |

(Continued)

*Primary Examiner* — Alfonso Perez Borroto
*Assistant Examiner* — Esayas Yeshaw
(74) *Attorney, Agent, or Firm* — Li & Cai Intellectual Property (USA) Office

(57) ABSTRACT

A wireless temperature maintenance container has an accommodating space accommodating a transmitter circuit and a receiver circuit. The transmitter circuit comprises a first power processing circuit and a transmitter coil. The first power processing circuit receives a utility power and outputs a first direct current. The transmitter coil receives the first direct current and generates a magnetic field. The receiver circuit comprises a receiver coil, a second power processing circuit and a temperature controller. The magnetic field passes the receiver coil and an alternating current is generated. The second power processing circuit receives the alternating current and outputs a second direct current. The temperature controller receives the second direct current to control the temperature of the container. The transmitter circuit is on the first circuit board, and the receiver circuit is on the second circuit board. Distance between the first circuit board and the second board is 2 mm~4 mm.

9 Claims, 3 Drawing Sheets

(56) References Cited

U.S. PATENT DOCUMENTS

| | | | | |
|---|---|---|---|---|
| 2010/0315045 A1* | 12/2010 | Zeine | ...................... | H02J 7/025 320/137 |
| 2011/0259953 A1* | 10/2011 | Baarman | ................. | G01F 23/20 235/375 |
| 2014/0085093 A1* | 3/2014 | Mittleman | ............ | H04L 12/282 340/628 |
| 2014/0132206 A1* | 5/2014 | Zhu | ........................ | H02J 50/12 320/108 |
| 2014/0159508 A1* | 6/2014 | Sankar | ................... | H02J 17/00 307/149 |
| 2015/0002088 A1* | 1/2015 | D'Agostino | ............ | H02J 7/025 320/108 |
| 2015/0327707 A1* | 11/2015 | Son | ......................... | H05B 6/06 219/621 |
| 2016/0064992 A1* | 3/2016 | Herbst | ................... | H02J 7/025 307/104 |
| 2017/0074908 A1* | 3/2017 | Nejatali | ............ | G01R 19/0092 |

* cited by examiner

WIRELESS TEMPERATURE MAINTENANCE CONTAINER

BACKGROUND OF THE INVENTION

1. Field of the Invention

The instant disclosure relates to a wireless temperature maintenance container; in particular, to a wireless temperature maintenance container that maintains the temperature of the contents via wireless power transmission.

2. Description of Related Art

With the development of technology, wireless power transmission has flourished. There are three major standard protocols in the wireless power transmission technology, which are respectively the Power Matters Alliance (PMA) standard protocol, the Wireless Power Consortium (WPC) standard protocol and the Alliance for Wireless Power (A4WP) standard protocol.

Compared with the traditional wired power transmission, the advantage of the wireless power transmission is that, all electric elements of the transmitter circuit and the receiver circuit are not exposed so that the electric elements can be protected from moisture or other gasses, which provides a usage security for a user and a longer service life for the electric elements. However, currently, most of the applications of wireless power transmission are portable electric products such as the smart phone or the like.

With respect to the food container with the temperature maintenance function, the internal heater or cooling circuit is provided power by a utility power or a battery via the wired power transmission. In this case, the electric elements for the power transmission in the food container are exposed to moisture or other gases all the time, and thus these electric elements are easily oxidized or etched.

SUMMARY OF THE INVENTION

The instant disclosure provides a wireless temperature maintenance container that has an accommodating space at its bottom to accommodate a transmitter circuit and a receiver circuit. The transmitter circuit comprises a first power processing circuit and a transmitter coil. The first power processing circuit receives a utility power, outputs a first direct current and converts the first direct current to an alternating current. The transmitter coil is connected to the first power processing circuit. The transmitter coil receives the alternating current and generates a magnetic field based on an electromagnetic induction. The receiver circuit comprises a receiver coil, a second power processing circuit and a temperature controller such as a heater or a cooler. The magnetic field passes the receiver coil and another alternating current is generated based on the electromagnetic induction. The second power processing circuit is connected to the receiver coil. The second power processing circuit receives the another alternating current and outputs a second direct current. The temperature controller is connected to the second power processing circuit. The temperature controller receives the second direct current to control the temperature of the wireless temperature maintenance container. The transmitter circuit is configured on the first circuit board, and the receiver circuit is configured on the second circuit board. In addition, there is a predetermined distance between the first circuit board and the second board.

In one embodiment of the wireless temperature maintenance container provided by the instant disclosure, the predetermined distance between the first circuit board and the second board is 2 mm~4 mm.

To sum up, in the wireless temperature maintenance container provided by the instant disclosure, the power is transmitted wirelessly from the transmitter circuit to the receiver circuit to provide a current to the temperature controller such as a heater or a cooler. Additionally, the transmitter circuit and the receiver circuit are accommodated in an accommodating space at the bottom of the wireless temperature maintenance container, so the temperature of the contents in the wireless temperature maintenance container can be maintained directly by the wireless power transmission between the transmitter circuit and the receiver circuit.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It should be understood that, although the terms first, second, third, and the like, may be used herein to describe various elements, these elements should not be limited by these terms. These terms are only to distinguish one element from another region or section discussed below. For example, a first element could be termed a second element and, similarly, a second element could be termed a first element, without departing from the teachings of the instant disclosure. As used herein, the term "and/or" includes any and all combinations of one or more of the associated listed items.

[One Embodiment of the Wireless Temperature Maintenance Container]

Figure 1:
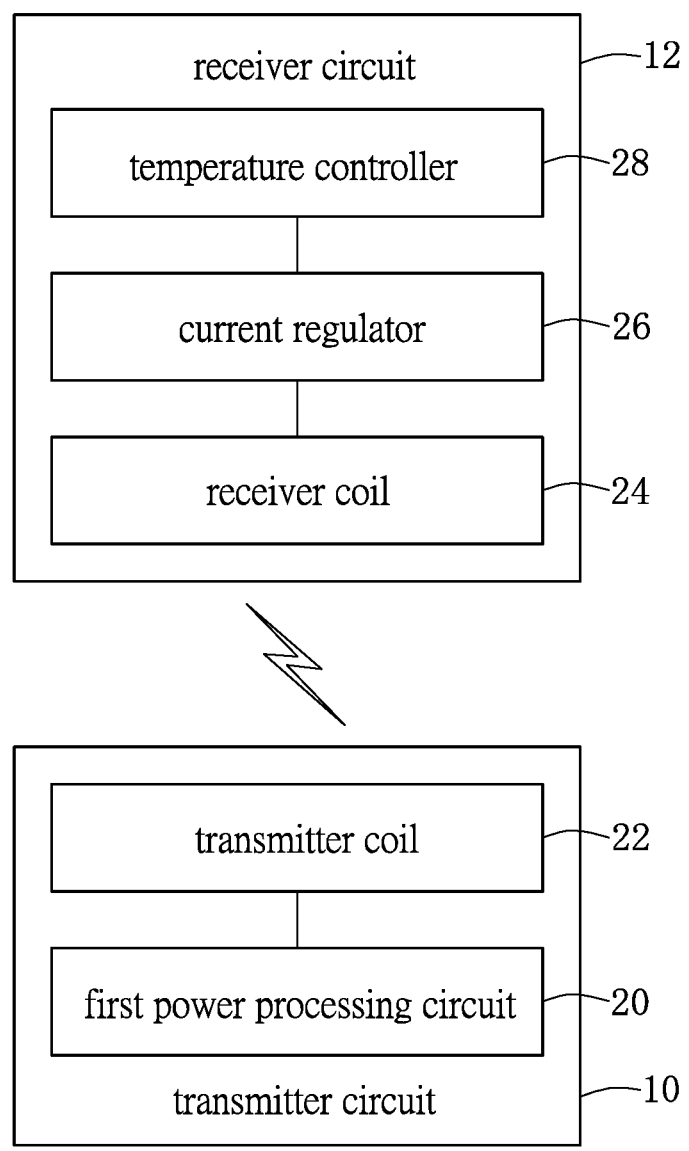
FIG. 1 shows a block diagram of a wireless temperature maintenance container of one embodiment of the instant disclosure.

Refer to FIG. 1. FIG. 1 shows a block diagram of a wireless temperature maintenance container of one embodiment of the instant disclosure. As shown in FIG. 1, the wireless temperature maintenance container 1 in this embodiment comprises a transmitter circuit 10 and a receiver circuit 12. The transmitter circuit 10 comprises a first power processing circuit 20 and a transmitter coil 22. The first power processing circuit 20 receives a utility power, outputs a first direct current and converts the first direct current to an alternating current. The transmitter coil 22 is connected to the first power processing circuit 20, and receives the alternating current to generate a magnetic field based on an electromagnetic induction. The receiver circuit 12 comprises a receiver coil 24, a second power processing circuit 26 and a temperature controller 28. The magnetic field passes through the receiver coil 24, and another alternating current is generated based on the electromagnetic induction. The second power processing circuit 26 is connected to the receiver coil 24, receives the another alternating current and outputs a second direct current. The temperature controller 28 is connected to the second power processing circuit 26 and receives the second direct current to control the temperature of the wireless temperature maintenance container. It is worth mentioning that, the transmitter circuit 10 is configured on a first circuit board (not shown), and the receiver circuit 12 is configured on a second circuit board (not shown). In addition, there is a predetermined distance between the first circuit board and the second circuit board. Moreover, the first circuit board having the transmitter circuit 10 and the second circuit board having the receiver circuit 12 are accommodated in the accommodating space (not shown) at the bottom of the wireless temperature maintenance container 1.

In other words, once the transmitter circuit 10 of the wireless temperature maintenance container 1 is connected to a utility power, the transmitter circuit 10 wirelessly transmits power to the receiver circuit 12, such that the temperature controller 28 of the receiver circuit 12 can work.

It is worth mentioning that, in practice, both of the first circuit and the second circuit are designed to have a housing for protection. In addition, the second circuit board is configured upon the first circuit board, and thus there is a distance between the transmitter circuit 10 and the receiver circuit, wherein the distance refers to a total thickness of the housings of the first circuit board and the second circuit board. However, in this embodiment, power can be wirelessly transmitted between the transmitter circuit 10 and the receiver circuit 12 within a predetermined distance. Thus, even though the total thickness of the housings of the first circuit board and the second circuit board forms a distance between the transmitter circuit 10 and the receiver circuit, the transmitter circuit 10 of the wireless temperature maintenance container 1 can still transmit power to the receiver circuit 12 of the wireless temperature maintenance container 1 in a wireless way.

Thereby, in the wireless temperature maintenance container 1, the housings of the first circuit board and the second circuit board can protect the electric elements on the first circuit board and the second circuit board from damage without affecting the power transmission between the first circuit board and the second circuit board. That is, there is no electrical contact point between the first circuit board and the second circuit board, but the power can still be successfully transmitted from the first circuit board to the second circuit. It should be noted that, in a preferred embodiment, the predetermined distance between the first circuit board having the transmitter circuit 10 and the second circuit board having the receiver circuit 12 is 2 mm~4 mm. In other words, the thickness of the housings of the first circuit board and the second circuit board can be 2 mm~4 mm in total. However, it is not limited herein.

It should also be noted that, in the wireless temperature maintenance container 1, the wireless power transmission between the transmitter circuit 10 and the receiver circuit 12 is suited to the WPC standard protocol, the PMA standard protocol or the A4WP standard protocol.

[Another Embodiment of the Wireless Temperature Maintenance Container]

Figure 2:
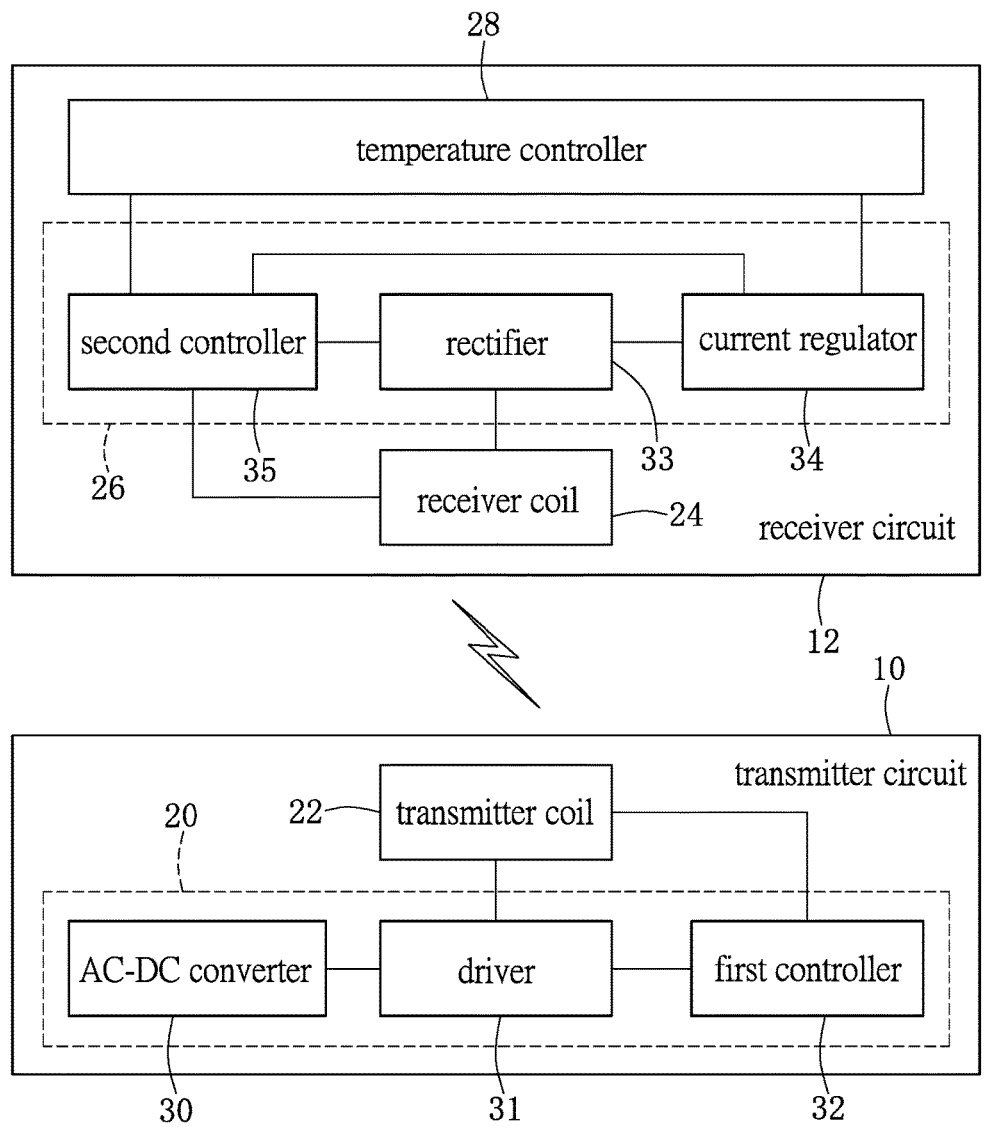
FIG. 2 shows a block diagram of a wireless temperature maintenance container of another embodiment of the instant disclosure.

Refer to FIG. 2. FIG. 2 shows a block diagram of a wireless temperature maintenance container of another embodiment of the instant disclosure. The working principles and the structures of the wireless temperature maintenance container 2 in this embodiment and the wireless temperature maintenance container 1 shown in FIG. 1 are similar but have differences in that, the first power processing circuit 20 of the wireless temperature maintenance container 2 in this embodiment comprises an AC-DC converter 30, a driver 31 and a first controller 32. Receiving a utility power, the AC-DC converter 30 transforms the utility power to output a first direct voltage. The driver 31 is connected to the AC-DC converter 30. Receiving the first direct voltage, the driver 31 outputs a first direct current and converts the first direct current to an alternating current to drive the transmitter coil 22 to generate a magnetic field based on an electromagnetic induction. The first controller 32 is connected to the driver 31 and the transmitter coil 22 to control the driver 31 and the transmitter coil 22. Another difference is that, the second power processing circuit 26 of the wireless temperature maintenance container 2 comprises a rectifier 33, a current regulator 34 and a second controller 35. The rectifier 33 is connected to the receiver coil 24. The rectifier 33 rectifies another alternating current output by the receiver coil 24 and generates a second direct current. The current regulator 34 is connected to the rectifier 33 to stabilize the second direct current. The second controller 35 is connected to the temperature controller 28, the receiver coil 24, the rectifier 33 and the current regulator 34, to control the temperature controller 28, the receiver coil 24, the rectifier 33 and the current regulator 34.

The following description illustrates how the first controller 32 of the first power processing circuit 20 and the second controller 35 of the second power processing circuit 26 work.

In this embodiment, the temperature controller 28 comprises a heater circuit (not shown) to heat up or maintain the temperature of the contents in the wireless temperature maintenance container 2. The heater circuit comprises at least a thermal resistor (not shown), wherein the thermal resistor is connected to the second controller 35. When the temperature controller 28 is heating up the contents in the wireless temperature maintenance container 2, the second controller 35 continually feeds back a data signal to the transmitter coil 22 via the receiver coil 24 according to a temperature value detected by the thermal resistor, and the first controller 32 determines whether to stop supplying power to the temperature controller 28 according to the data signal. Specifically speaking, if the temperature value of the temperature controller 28 detected by the thermal resistor is equal to or larger than a threshold temperature, the first controller 32 determines and controls the driver 31 to adjust the first direct current according to the data signal, then the alternating current received by the transmitter coil 22 is adjusted, and thus the power supplied to the temperature controller 28 is adjusted. At this moment, instead of heating up the contents in the wireless temperature maintenance container 2, the temperature controller 28 maintains the temperature of the contents in the wireless temperature maintenance container 2. It should be noted that, in this embodiment, the threshold temperature of the temperature controller 28 can be set by a user depending on need, and it is not limited herein.

Thereby, the power supplied to the temperature controller 28 can be appropriately adjusted by the first controller 32 of the first power processing circuit 20 and the second controller 35 of the second power processing circuit 26, such that the contents in the wireless temperature maintenance container 2 can be effectively heated up or can be maintained at a constant temperature, and a better usage security can be provided.

On the other hand, the type of the temperature controller 28 is not limited herein. In other words, instead of a heater circuit, the temperature controller 28 can comprises a cooling circuit (not shown) in another embodiment, to cool the contents in the wireless temperature maintenance container 2 or to maintain the temperature of the contents.

In addition, in this embodiment, the transmitter circuit 10 further comprises a status display (not shown), and the status display is connected to the first controller 32 of the first power processing circuit 20. At the moment when the wireless temperature maintenance container 2 is connected to a utility power and the power is transmitted wirelessly from the transmitter circuit 10 to the receiver circuit 12, the first controller 32 controls the status display to flick once or several times, to indicate that power is now provided to the temperature controller 28. For example, the status display can be an LED, but it is not limited herein.

It should be noted that, in the wireless temperature maintenance containers 2, the wireless power transmission between the transmitter circuit 10 and the receiver circuit 12 is suited to the WPC standard protocol, the PMA standard protocol or the A4WP standard protocol.

Figure 3:
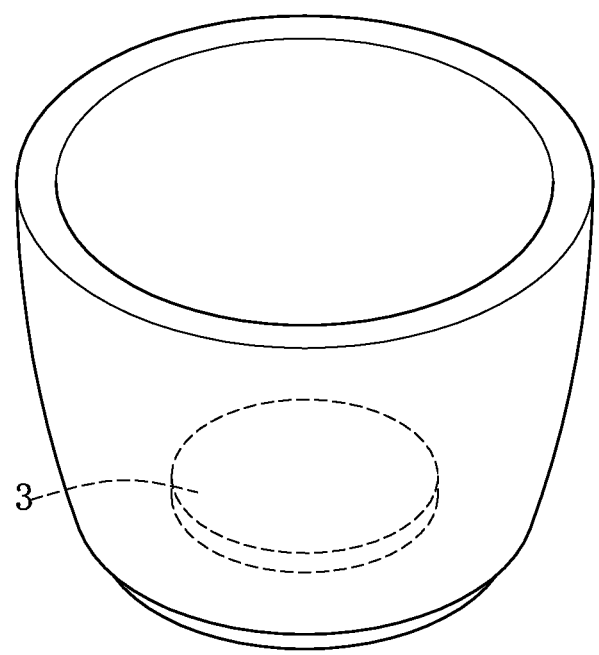
FIG. 3 shows a schematic diagram showing the structure of a wireless temperature maintenance container of one embodiment of the instant disclosure.

The following description illustrates the structure of the wireless temperature maintenance containers in the above embodiments. FIG. 3 shows a schematic diagram showing the structure of a wireless temperature maintenance container of one embodiment of the instant disclosure.

As shown in FIG. 3, in one embodiment, a transmitter circuit configured on a first circuit board and a receiver circuit configured on a second circuit board are accommodated in an accommodating space at the bottom of a wireless temperature maintenance container 3. For example, the wireless temperature maintenance container 3 can be a bottle, a cup, a pot or the like, and there is an accommodating space at its bottom, wherein the transmitter circuit configured on a first circuit board and a receiver circuit configured on a second circuit board are accommodated in an accommodating space at the bottom of a wireless temperature maintenance container 3, as shown in FIG. 3. Once a user connects the transmitter circuit inside the wireless temperature maintenance container 3 to a utility power, the transmitter circuit can wirelessly transmit power to the receiver circuit for heating up or cooling the contents in the wireless temperature maintenance container 3 or for maintaining the temperature of the contents in the wireless temperature maintenance container 3.

To sum up, in the wireless temperature maintenance container provided by the instant disclosure, the power is transmitted wirelessly from the transmitter circuit to the receiver circuit to provide a current to the temperature controller such as a heater or a cooler. Additionally, the transmitter circuit and the receiver circuit are accommodated in an accommodating space at the bottom of the wireless temperature maintenance container, so the temperature of the contents in the wireless temperature maintenance container can be maintained directly by the wireless power transmission between the transmitter circuit and the receiver circuit.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A wireless temperature maintenance container, having an accommodating space at its bottom, comprising:
a transmitter circuit, configured in the accommodating space, comprising:
a first power processing circuit, receiving a utility power, outputting a first direct current and converting the first direct current to an alternating current; and
a transmitter coil, connected to the first power processing circuit, receiving the alternating current and generating a magnetic field based on an electromagnetic induction;
a receiver circuit, configured in the accommodating space, comprising:
a receiver coil, the magnetic field passing through the receiver coil to generate another alternating current based on the electromagnetic induction;
a second power processing circuit, connected to the receiver coil, including:
a rectifier, connected to the receiver coil, rectifying the another alternating current and generating a second direct current;
a current regulator, connected to the rectifier, stabilizing the second direct current; and
a second controller, connected to the receiver coil, the rectifier and the current regulator, to control the receiver coil, the rectifier and the current regulator; and
a temperature controller, connected to the second controller, controlled by the second controller, receiving the second direct current and controlling the temperature of the wireless temperature maintenance container according to the second direct current;
wherein the transmitter circuit is configured on a first circuit board, the receiver circuit is configured on a second circuit board, and there is a predetermined distance between the first circuit board and the second circuit board.

2. The wireless temperature maintenance container according to claim 1, wherein the predetermined distance between the first circuit board and the second circuit board is 2 mm~4 mm.

3. The wireless temperature maintenance container according to claim 1, wherein the first power processing circuit comprises:
an AC-DC converter, receiving the utility power, transforming the utility power to output a first direct voltage;
a driver, connected to the AC-DC converter, receiving the first direct voltage, outputting the first direct current and converting the first direct current to the alternating current, to drive the transmitter coil to generate the magnetic field based on the electromagnetic induction; and
a first controller, connected to the driver and the transmitter coil, controlling the driver and the transmitter coil.

4. The wireless temperature maintenance container according to claim 1, wherein the temperature controller comprises a heater circuit, the heater circuit comprises at least one thermal resistor and the thermal resistor is connected to the second controller.

5. The wireless temperature maintenance container according to claim 4, wherein when the wireless temperature maintenance container is working, the second controller continually feeds back a data signal to the transmitter coil via the receiver coil according to a temperature value detected by the thermal resistor, and the first controller determines whether to stop supplying power to the temperature controller according to the data signal.

6. The wireless temperature maintenance container according to claim 5, wherein the first controller determines and controls the driver to adjust the first direct current according to the data signal if the temperature value detected by the thermal resistor is equal to or larger than a threshold temperature.

7. The wireless temperature maintenance container according to claim 1, wherein the temperature controller comprises a cooling circuit.

8. The wireless temperature maintenance container according to claim 3, wherein the transmitter circuit further comprises a status display connected to the first controller of the first power processing circuit.

9. The wireless temperature maintenance container according to claim 1, wherein the wireless power transmission between the transmitter circuit and the receiver circuit is suited to the WPC standard protocol, the PMA standard protocol or the A4WP standard protocol.

\* \* \* \* \*